(12) United States Patent
Meyer et al.

(10) Patent No.: US 6,601,190 B1
(45) Date of Patent: Jul. 29, 2003

(54) AUTOMATIC CAPTURE AND REPORTING OF COMPUTER CONFIGURATION DATA

(75) Inventors: John E. Meyer, Spring, TX (US); John S. Harsany, Houston, TX (US); Tim J. Lyons, Tustin, TX (US); David E. Gorman, Irvine, CA (US); Hung K. Dinh, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/429,681

(22) Filed: Oct. 28, 1999

(51) Int. Cl.$^7$ ................................. G06F 11/00
(52) U.S. Cl. ......................... 714/37; 714/27
(58) Field of Search ............................ 714/26, 32, 37, 714/46, 27, 57; 702/188, 186, 183

(56) References Cited

U.S. PATENT DOCUMENTS

| | | | |
|---|---|---|---|
| 5,367,667 A | * 11/1994 | Wahlquist et al. | 395/575 |
| 5,455,933 A | 10/1995 | Schieve et al. | |
| 5,668,944 A | * 9/1997 | Berry | 714/47 |
| 5,678,002 A | * 10/1997 | Fawcett et al. | 395/183.01 |
| 5,699,505 A | * 12/1997 | Srinivasan | 714/31 |
| 5,748,877 A | 5/1998 | Dollahite et al. | |
| 5,758,071 A | * 5/1998 | Burgess et al. | 709/220 |
| 5,854,828 A | 12/1998 | Kocis et al. | |
| 5,862,322 A | * 1/1999 | Anglin et al. | 714/57 |
| 5,884,073 A | * 3/1999 | Dent | 714/27 |
| 6,003,081 A | * 12/1999 | Cromer et al. | 709/224 |
| 6,016,466 A | * 1/2000 | Guinther et al. | 702/186 |
| 6,023,507 A | * 2/2000 | Wookey | 709/224 |
| 6,065,136 A | * 5/2000 | Kuwabara | 714/31 |
| 6,163,856 A | * 12/2000 | Dion et al. | 709/213 |
| 6,167,537 A | * 12/2000 | Silva et al. | 714/46 |
| 6,170,065 B1 | * 1/2001 | Kobata et al. | 714/7 |
| 6,182,249 B1 | * 1/2001 | Wookey et al. | 714/47 |
| 6,247,149 B1 | * 6/2001 | Falls et al. | 714/45 |
| 6,263,457 B1 | * 7/2001 | Anderson et al. | 714/38 |
| 6,298,457 B1 | * 10/2001 | Rachlin et al. | 714/49 |
| 6,321,348 B1 | * 11/2001 | Kobata | 714/37 |
| 6,338,149 B1 | * 1/2002 | Ciccone et al. | 714/38 |
| 6,360,331 B2 | * 3/2002 | Vert et al. | 709/239 |
| 6,367,035 B1 | * 4/2002 | White | 714/40 |
| 2001/0018691 A1 | * 8/2001 | Sakakibara et al. | 707/104.1 |

* cited by examiner

Primary Examiner—Robert Beausoliel
Assistant Examiner—Marc M Duncan

(57) ABSTRACT

A method for servicing computers using diagnostics programs to capture and report comprehensive configuration information to customer service via email.

8 Claims, 6 Drawing Sheets

AUTOMATIC CAPTURE AND REPORTING OF COMPUTER CONFIGURATION DATA

The present application relates to diagnosis and service of computer faults.

BACKGROUND AND SUMMARY OF THE INVENTION

In recent decades, computers have become integral tools for information processing. Businesses and individuals rely on commercially available PCs for many purposes. To be competitive, companies provide extensive customer support for the machines they sell, and considerable resources are expended on diagnosis and repair of computers.

Service personnel can gather the information they need by going to the actual site of the computer. This is expensive and usually not cost effective. More often, service personnel speak directly with customers over the telephone to get information about the problem. However, problems with the operation of computers may often be complex, and users do not always know what information service personnel need in order to resolve the service call.

This problem can be partially addressed by a diagnostics program that resides on the customer's computer (e.g., Compaq Diagnostics for Windows) and locally collects hardware and operating system information from the computer. The customer verbally provides this information to customer service during a service call.

Problems with the operation of a computer can often be complex, or require technical changes in files found on the customer's computer. The information offered by diagnostics programs is usually extensive, detailed information relating to hardware and software configurations, minor changes in which are usually the cause of computer faults. When a customer tries to get help from customer service, the customer must still participate to relay the results from the diagnostics program to the service technician over the telephone. This can result in a trial-and-error method of problem solving, with the technician asking questions, the customer providing information, then following the technicians instructions to make the needed changes. This process repeats until the problem is solved, which sometimes requires many iterations, or until frustration and time consumption lead the customer, the technician, or both, to give up. This process would be greatly simplified were the technician to have direct access to the information provided by the diagnostics program.

Automatic Capture and Reporting of Computer Configuration Data

The information provided by diagnostics programs does not identify recent configuration changes in the hardware and software. Recent configuration changes are often the source of a computer problem, so there is need for a way to generate comprehensive configuration snapshots for service personnel to use during a service call.

The present application teaches, among many things, an improved method of servicing and diagnosing computer faults. The primary requirements for computer service tools include on-line functionality to identify and resolve problems without taking the computer off-line, and a simple collection process for gathering the computer information required to effectively resolve service cases. This application provides a simplified process of capturing comprehensive information about the computer hardware and operating system and sending that and other information to customer service using existing hardware.

A diagnostics program records hardware and operating system configurations when the program is installed on the computer. Later, when a computer owner calls customer service with a problem, the computer owner runs the diagnostic program, which prompts the customer for email account information, telephone number, and information on the computer problem. The diagnostics program then captures the current computer hardware and operating system configuration. The program performs this capture without the need to restart the computer or take it off-line. The program next uses the email account information to activate the email system and send the information about the problem provided by the customer along with the hardware and operating system configuration information to customer service. The program then logs out of the email system. Customer service uses this data to help service the computer.

This innovation streamlines the computer service process by enabling quick and easy access to detailed information about a computer's hardware and software configuration. It allows faster problem resolution time, since essential and reliable data is gathered and made directly available to customer service. This reduces administration costs and resource expenditure in customer service and diagnostics, while maintaining or improving quality of service to the customer. Computer downtime for the customer is also reduced since service calls are resolved more quickly.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

In the preferred embodiment, the application operates on a computer with Windows 95/98/NT/2000 operating system, and relies on the MAIL API (Application Programming Interface), also known as MAPI, which provides the communications layer for sending the information to customer service. An API allows an application to use the operating system to do something (in this case, activate the email system on the computer) without requiring the application to interact directly with the lower primitives of the operating system.

The design of the application builds on the service tool known as Compaq Diagnostics for Windows, which captures comprehensive hardware configuration information.

Figure 1:
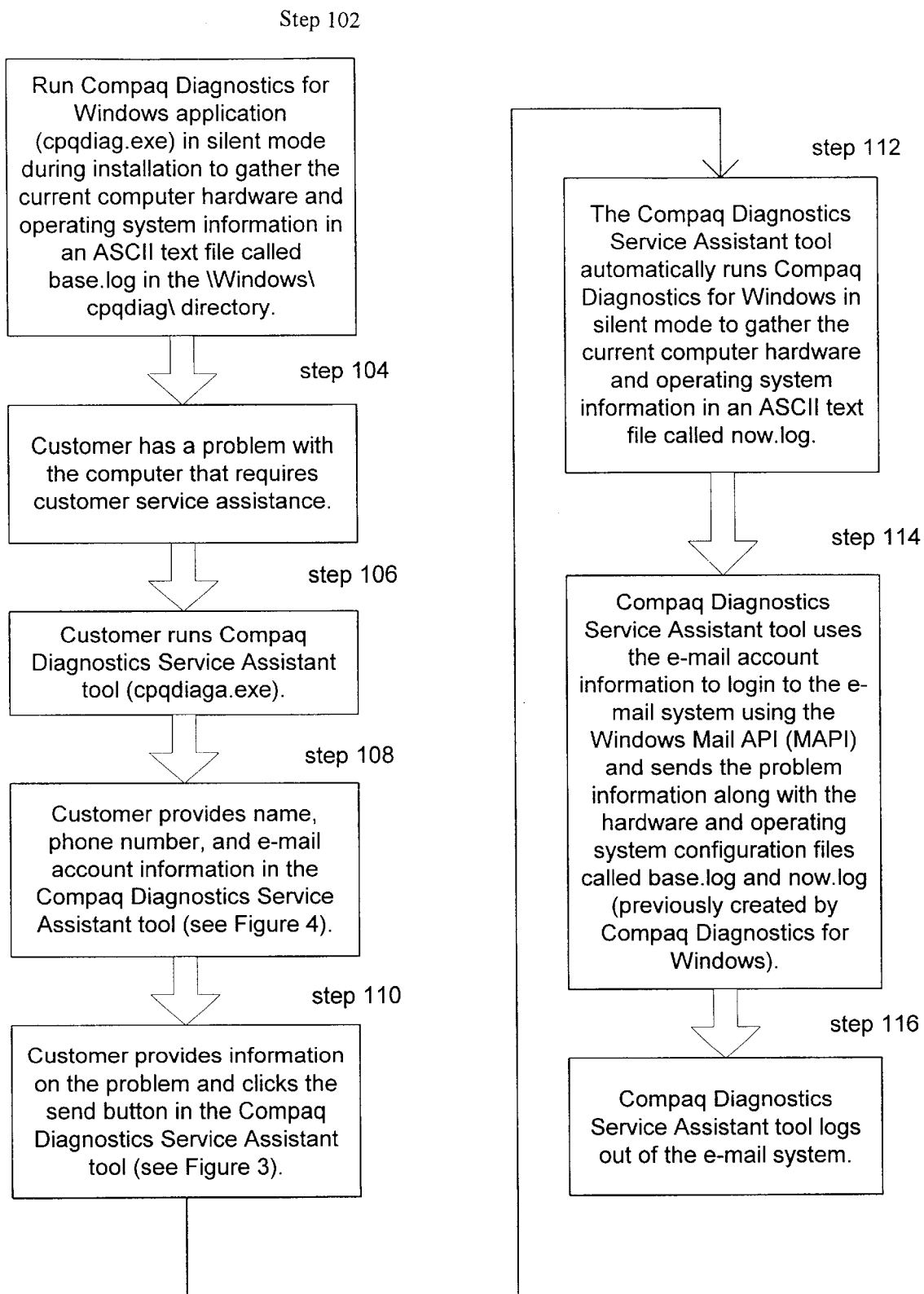
FIG. 1 shows a flowchart of the process of the presently preferred embodiment.

Referring to FIG. 1, an innovation for servicing computers begins in the preferred embodiment in step 102, when Compaq Diagnostics for Windows application (cpqdiag.exe) runs in a silent mode during installation to gather the initial computer hardware and operating system information in an ASCII text file called base.log in the \Windows\cpqdiag\ directory. Later, the customer has a problem on the computer that requires customer service assistance (step 104), and runs Compaq Diagnostics Service Assistant tool (cpqdiaga.exe) (step 106). This program asks the customer to provide name, telephone number, and email account information in a Compaq Diagnostics Service Assistant tool dialog box (step 108), shown also in FIG. 4. The customer also provides information about the computer problem itself in another dialog box shown in FIGS. 2 and 3. The customer then clicks the "send" button (step 110). The Compaq Diagnostics Service Assistant tool automatically runs Compaq Diagnostics for Windows in silent mode to gather the current computer hardware and operating system information in an ASCII text file called now.log (step 112). Compaq Diagnostics Service Assistant tool then uses the email account information to login to the email system using the Windows MAPI and sends the problem information along with the hardware and operating system configuration files (base.log and now.log) to customer service (step 114), who uses the information to aid in resolving the service call. Compaq Diagnostics Service Assistant tool logs out of the email system (step 116).

Figure 4:
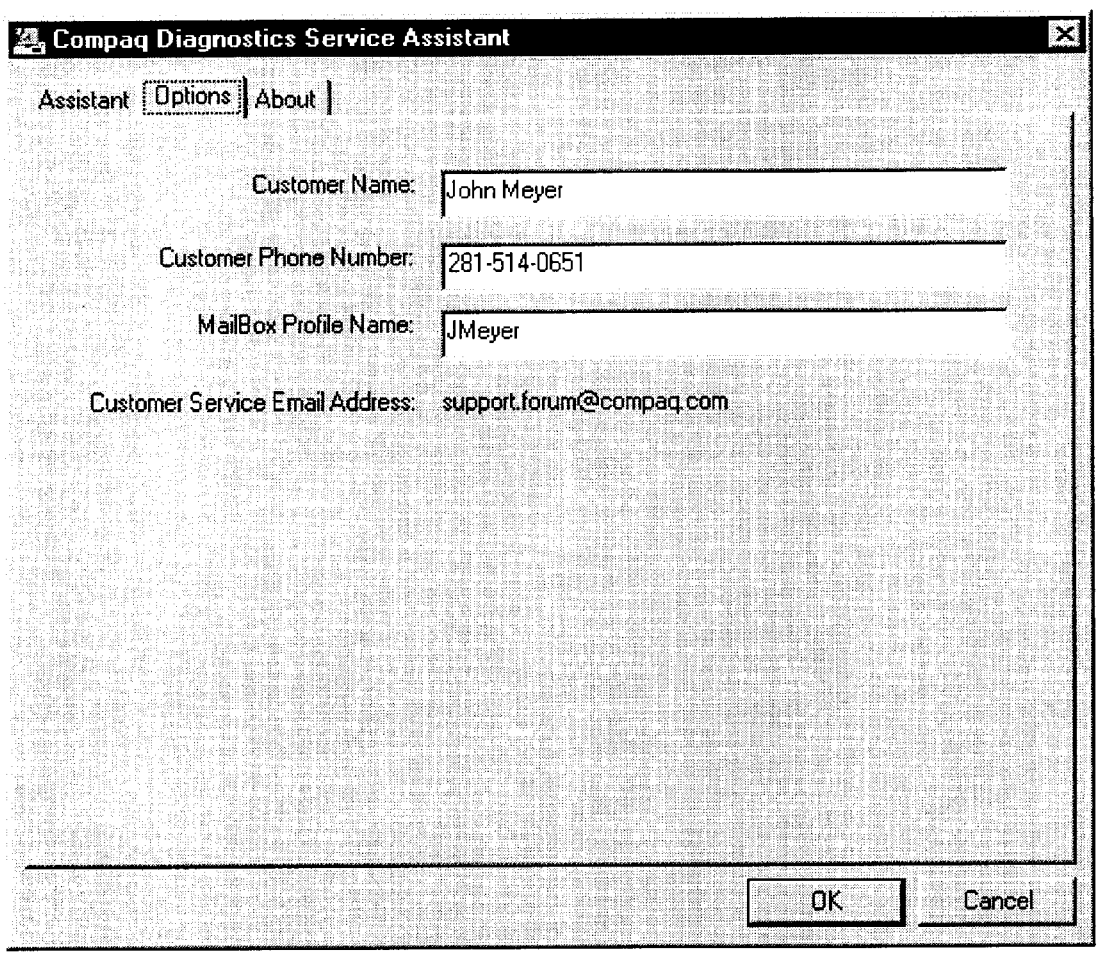
FIG. 4 shows a dialog box prompting the user for telephone number, name, and email account information.

FIG. 4 shows a sample dialog box in the Compaq Diagnostics Service Assistant tool, prompting the user to enter their name, telephone number, and email account information. The application uses this information to access the user's email account through the MAPI.

Figure 2:
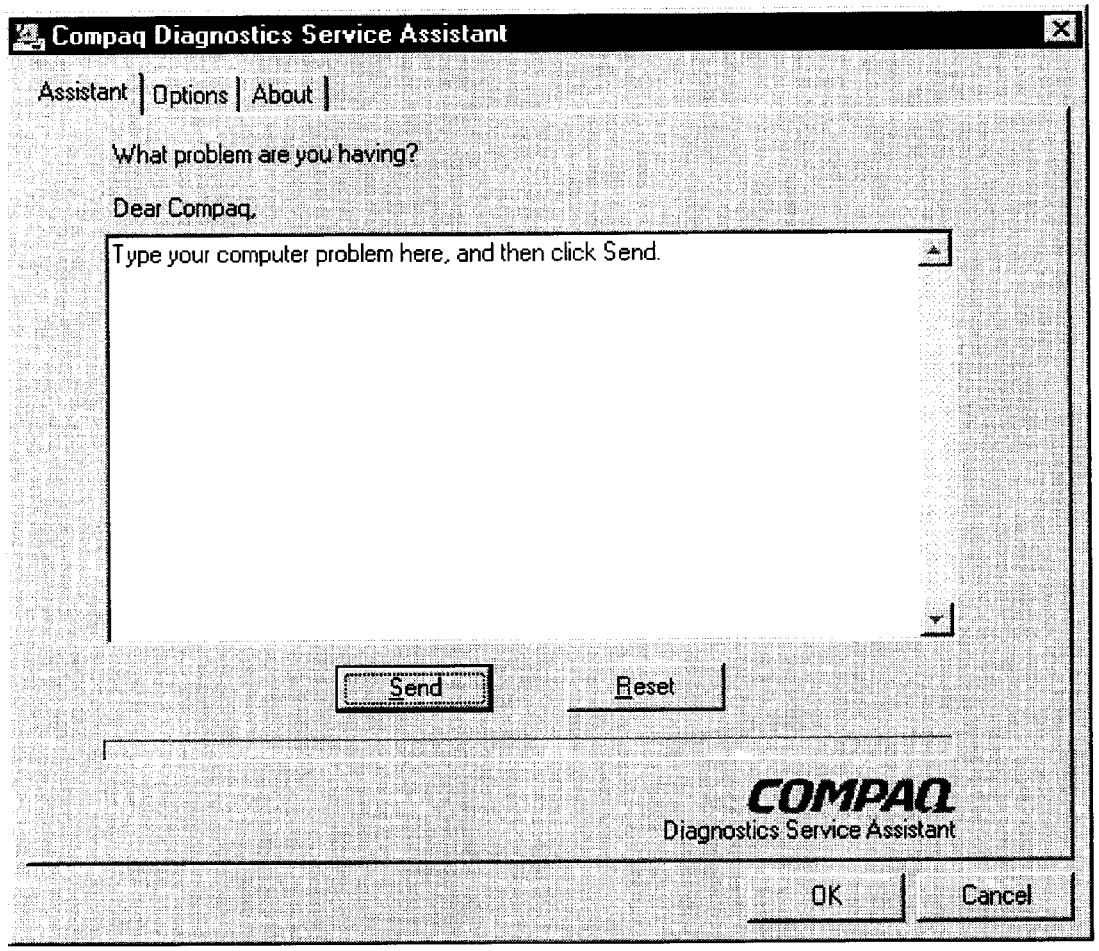
FIG. 2 shows a sample dialog box encountered by the user which prompts the user for information about the computer problem.
Figure 3:
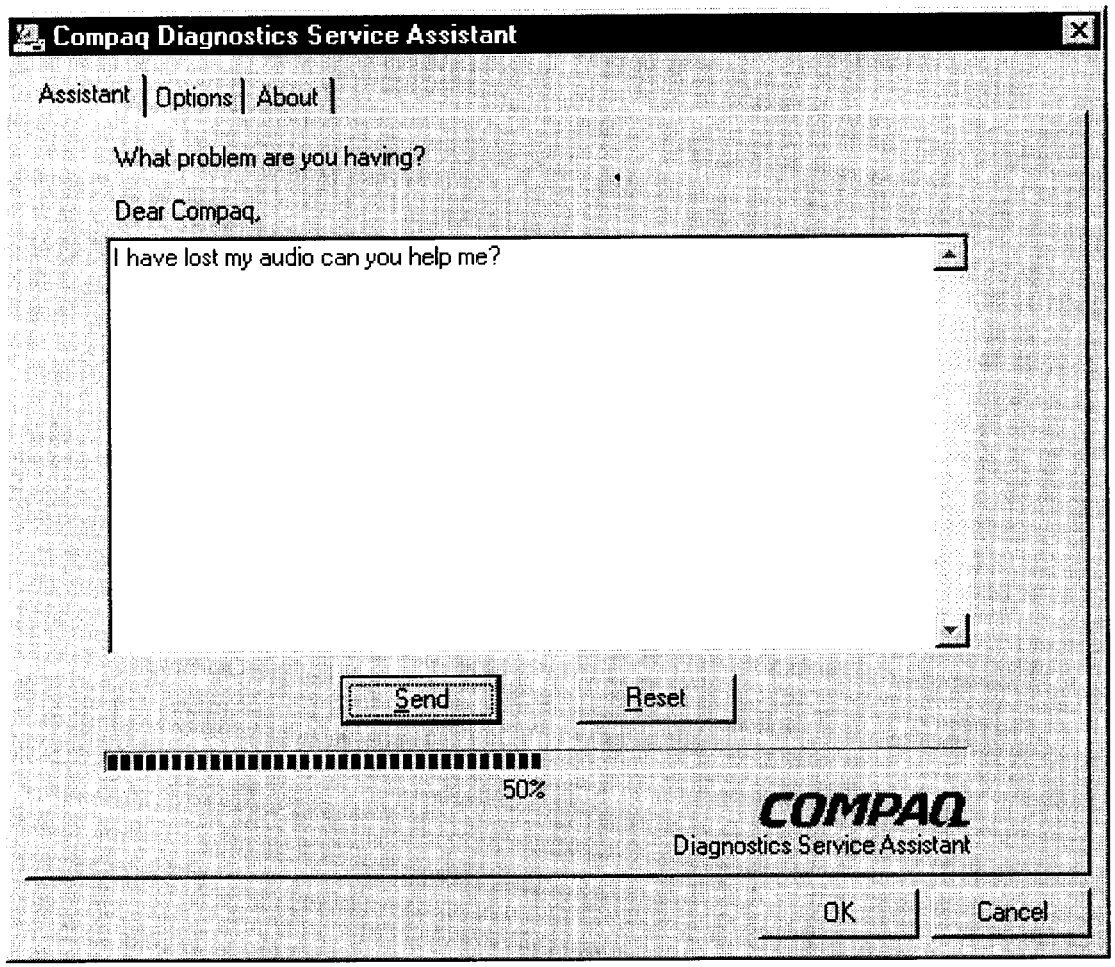
FIG. 3 shows a completed dialog box with the user's hypothetical problem, ready to send to customer service.

FIG. 2 shows a sample dialog box in the Compaq Diagnostics Service Assistant tool which asks the user for information about the particular computer problem. The user types in a description of the problem, shown in FIG. 3, and clicks the "send" button. At this time, the user has entered all the necessary information, and the Compaq Diagnostics Service Assistant tool does the rest. It automatically runs Compaq Diagnostics for Windows, which reads the present configuration information for the computer's hardware and operating system and stores it in an ASCII text file now.log. This file, along with the earlier generated base.log and the user provided information regarding the problem, are automatically emailed to customer service.

Figure 5:
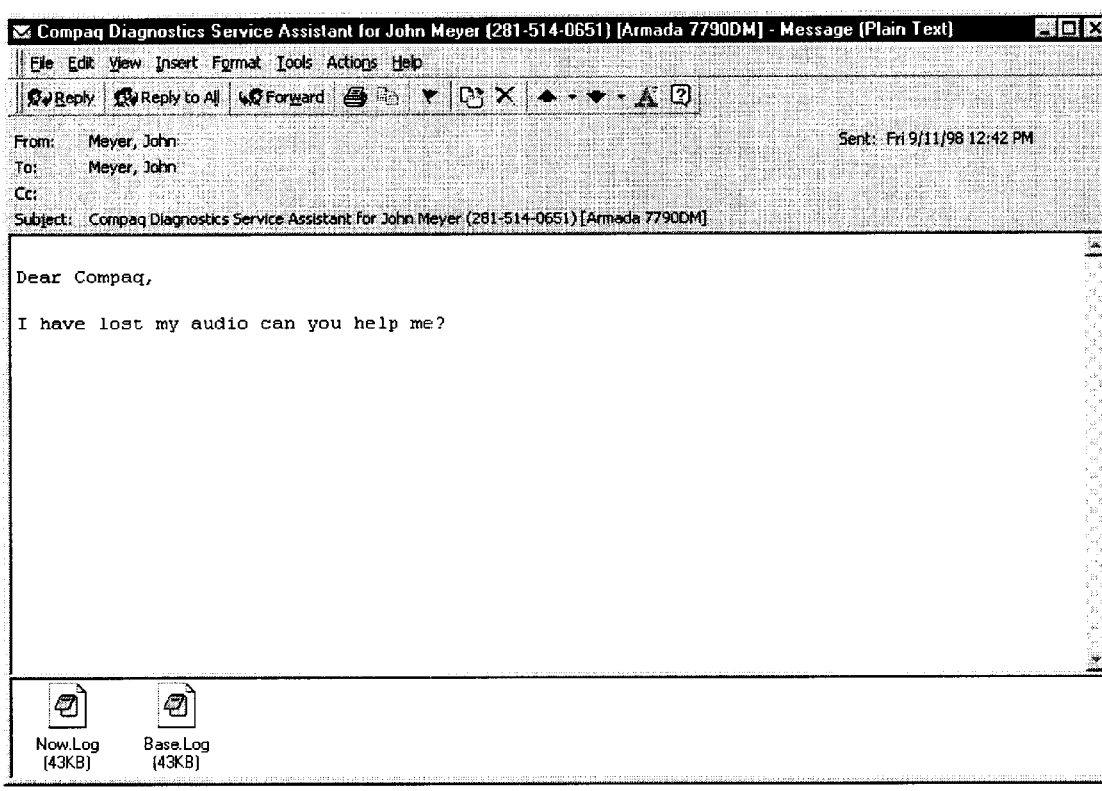
FIG. 5 shows a sample of the information emailed to customer service, including the customer's problem and the configuration files base.log and now.log generated by Compaq Diagnostics for Windows.

FIG. 5 shows a sample of what information is sent to customer service via email, including the message from the user describing the problem, and the two sets of configuration data collected by Compaq Diagnostics for Windows, now.log and base.log.

Figure 6:
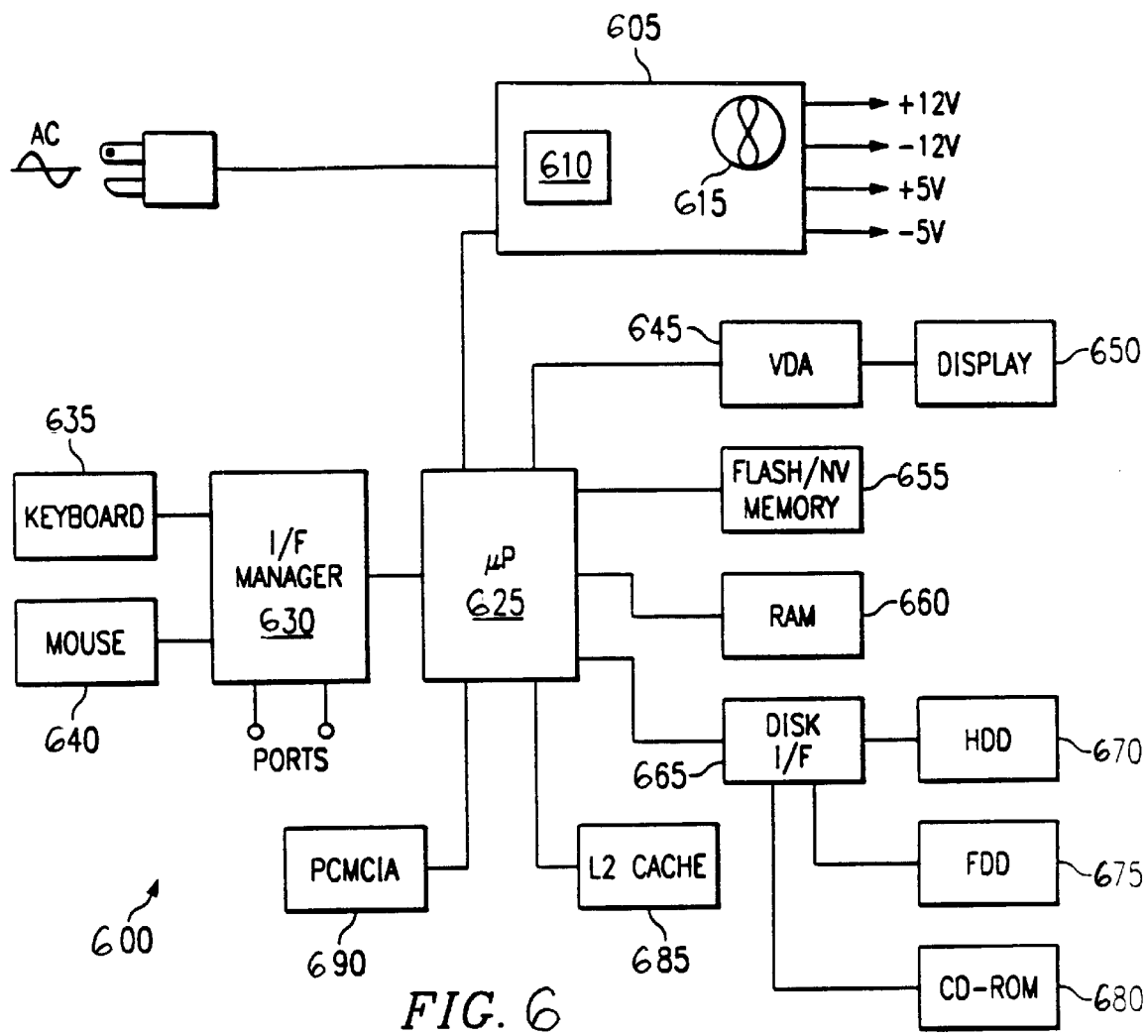
FIG. 6 shows a computer according to the presently preferred embodiment.

FIG. 6 shows a block diagram of a computer system 600 according to the presently preferred embodiment. In this example, the computer system, includes:
  user input devices (e.g. keyboard 635 and mouse 640);
  at least one microprocessor 625 which is operatively connected to receive inputs from said input device, through an interface manager chip 630 (which also provides an interface to the various ports);
  a power supply 605 which is connected to draw power from AC mains and provide DC voltage to the computer system 600 components; the innovative power supply control circuit 610, located within the power supply 605, connects to a fan 615 and also interfaces to the microprocessor 625;
  a memory (e.g. flash or non-volatile memory 655 and RAM 660), which is accessible by the microprocessor;
  a data output device (e.g. display 650 and video display adapter card 645) which is connected to output data generated by microprocessor; and
  a magnetic disk drive 670 which is read-write accessible, through an interface unit 665, by the processor.

Optionally, of course, many other components can be included, and this configuration is not definitive by any means. For example, the computer may also include a CD-ROM drive 680 and floppy disk drive ("FDD") 675 which may interface to the disk interface controller 665. Additionally, L2 cache 685 may be added to speed data access from the disk drives to the microprocessor, and a PCMCIA 690 slot accommodates peripheral enhancements.

The attached output offers a sample file format for the base.log and now.log output files. The information gathered in these files relates to the system itself, asset control, input devices, communication, storage, video, memory, multimedia, the operating system, architecture, computer health, and various miscellaneous data.

The system data displayed includes the date and time, the name of the computer product, a machine ID, processor statistics, and system ROM information.

Asset control output includes the product name, which processor is used, and an asset tag.

Input devices output includes information on the keyboard and the mouse.

Communication output displays data for the various ports.

Storage data includes logical drive information and physical drive information.

Video output includes the current graphics resolution, the primary monitor attached, video display driver, and the video controller ROM.

Memory output includes the system board, total memory, and windows memory information.

Multimedia output includes data about the CDROM, the mixer device driver capabilities, the waveform output device driver capabilities, waveform input device driver capabilities, MIDI input and output device driver capabilities, and auxiliary audio device driver capabilities.

Windows output includes which version of Windows is in use, the locations of directories, and Windows memory information.

Architecture output includes PCI device information, and whether the system has PCMCIA capabilities.

Health output includes the temperature, and whether the ROM has embedded diagnostics.

Some of the miscellaneous output information deals with when the system was last modified, BIOS data, system configuration memory, interrupt vector table, a power conversion record, system standby timeout record, screen saver record, hard drive timeout record, security features record, processor/memory/cache record, general system peripheral and input device information record, memory module information record, timeout default value record, extended disk support record, and a product name header record.

Sample Now.log/Base.log file format

| Compaq Diagnostics for Windows 2.11 | |
|---|---|
| System | |
| Date | 9/8/98 |
| Time | 10:07:40AM |
| Product | Armada 7792DM |
| Machine ID | |
| From System Board | 2BC |
| Processor | Pentium ® w/ MMX at 266 MHz |
| CPU ID | 0581 |
| Numeric Coprocessor | Integrated 387-Compatible |
| Secondary Cache | Installed |
| Size | 512 Kbytes |
| Write policy | Write back |
| Optional | Optional/Permanent |
| Asset tag | 7804BS521071 |
| Current System Speed | High |
| System ROM | |
| Revision | 3/20/98 |
| Family | 586S |
| Flashable | Yes |
| Socketed | No |
| Video Controller ROM | |
| Revision | 12/15/97 |
| Does ROM support F10 partition | Yes |
| Backup copy of CMOS supported | No |
| Does ROM have embedded diagnostics | No |
| Armada 7792DM is a trademark of Compaq Computer Corporation. | |
| Asset Control | |
| Product | Armada 7792DM |
| Processor | Pentium ® w/ MMX at 266 MHz |
| Asset tag | 7804BS521071 |
| System board revision level | |
| Assembly Version | 1 |
| Functional Revision Level | A |
| Input Devices | |
| Keyboard | |
| Type | (101- or 102-key) IBM enhanced/compatible |
| Number of function keys | 12 |
| Speed | 15 ms |
| Delay | 0 ms |
| Mouse | |
| Type | Standard PS/2 Port Mouse |
| Speed | 1 |
| Double click time | 500 ms |
| Buttons swapped | No |
| Communication | |
| LPT Ports | LPT 1 (Address 0x0378) |
| COM Ports | COM 1 (Address 0x03F8) |
| | COM 2 (Address 0x02F8) |
| | COM 3 (Address 0x03E8) |
| Modem | Compaq SpeedPaq 33.6 Fax |
| Baud | 33600 |
| Port | COM2 |
| Variant | United States |
| Firmware | 1.22 |
| Storage | |
| Logical Drive Information | |
| C: Hard Drive | 1.996 GB (59 MB Free) |
| D: Hard Drive | 1.996 GB (228 MB Free) |
| E: Hard Drive | 760 (240 MB Free) |
| F: CD-ROM Drive | |
| H: Remote/Network Drive | |
| I: Remote/Network Drive | |
| K: Remote/Network Drive | |
| L: Remote/Network Drive | |
| N: Remote/Network Drive | |

-continued

| Compaq Diagnostics for Windows 2.11 | |
|---|---|
| Q: Remote/Network Drive | |
| S: Remote/Network Drive (Drive_E) | |
| U: Remote/Network Drive | |
| Physical Drive Information | |
| IBM-DPLA-25120 Hard Drive | |
| | |
| Capacity | 5124 MB |
| Serial Number | D34D31L5589 |
| Firmware Revision | PL8OAB1A |
| Interface | IDE |
| Controller | Primary |
| Position | Master |
| Compaq Fibre Channel Tape Controller | |
| | |
| Firmware Revision | y̅ |
| Devices Attached | 0 |
| COMPAQ CRD-S311 CDROM | |
| | |
| Firmware Revision | 1.05 |
| Adapter | 0 |
| Target | 1 |
| Lun | 0 |
| Video | |
| | |
| Current graphics resolution | 1024 × 768 |
| Primary Monitor attached to | S3 Aurora64V+ Graphics Controller |
| Video device driver(s) | |
| DISPLAY.DRV=pnpdrvr.drv | |
| 386GRABBER=vgafull.3gr | |
| | |
| Date and Time | 8/24/96, 11:11:10AM |
| Size | 14624 Bytes |
| Company Name | Microsoft Corporation |
| Product Name (Driver) | Microsoft ® Windows ® Operating System |
| Product Version | 4.00.950 |
| File Description | Combined VGA/DIB 386 enhanced mode display |
| component | |
| | |
| File Version | 4.00.950 |
| Internal Name | GRABBER |
| Original Filename | VGAFULL.3GR |
| Design operating system | DOS-Win16 |
| Display Panel Type | 4 |
| Video Controller ROM Revision | 12/15/97 |
| Memory | |
| | |
| System Board | 16 Megabytes |
| DIMM Slot 1 | 0 Megabytes |
| DIMM Slot 2 | 16 Megabytes |
| Total Compaq Memory | 32 Megabytes |
| Windows Memory Information | |
| | |
| Total Physical Memory | 33054 Kbytes |
| Free Physical Memory | 0 Kbytes |
| Total Virtual Memory | 2143289 Kbytes |
| Free Virtual Memory | 2053373 Kbytes |
| Multimedia | |
| COMPAQ CRD-S311 CDROM | |
| | |
| Firmware Revision | 1.05 |
| Adapter | 0 |
| Target | 1 |
| Lun | 0 |
| Mixer device driver(s) capabilities (see Compaq for technical support) | |
| | |
| Product Name (Driver) | ESS AudioDrive Mixer (220) |
| Company Name | ESS Technology |
| Product Identifier | 39 |
| Driver Version | 4.4 |
| Destination Lines | 3 |
| Waveform Output device driver(s) capabilities (see Compaq for technical support) | |
| | |
| Product Name (Driver) | ESS AudioDrive Playback (220) |
| Company Name | ESS Technology |
| Product Identifier | 37 |
| Driver Version | 4.4 |
| Pitch Control | Not Supported |

-continued

| Compaq Diagnostics for Windows 2.11 | |
|---|---|
| Playback Rate Control | Not Supported |
| Volume Control | Separate left and right control |
| Output Format | Stereo |
| Formats Supported | 11.025 kHz, 8-bit, Mono |
| | 11.025 kHz, 8-bit, Stereo |
| | 11.025 kHz, 16-bit, Mono |
| | 11.025 kHz, 16-bit, Stereo |
| | 22.050 kHz, 8-bit, Mono |
| | 22.050 kHz, 8-bit, Stereo |
| | 22.050 kHz, 16-bit, Mono |
| | 22.050 kHz, 16-bit, Stereo |
| | 44.100 kHz, 8-bit, Mono |
| | 44.100 kHz, 8-bit, Stereo |
| | 44.100 kHz, 16-bit, Mono |
| | 44.100 kHz, 16-bit, Stereo |
| Waveform Output device driver(s) capabilities (see Compaq for technical support) | |
| | |
| Product Name (Driver) | Compaq Portable Wave #00 Line |
| Company Name | Compaq Computer Corporation |
| Product Identifier | 11 |
| Driver Version | 0.1 |
| Output Format | Monaural |
| Waveform Input device driver(s) capabilities (see Compaq for technical support) | |
| | |
| Product Name (Driver) | ESS AudioDrive Record (220) |
| Company Name | ESS Technology |
| Product Identifier | 38 |
| Driver Version | 4.4 |
| Input Format | Stereo |
| Formats Supported | 11.025 kHz, 8-bit, Mono |
| | 11.025 kHz, 8-bit, Stereo |
| | 11.025 kHz, 16-bit, Mono |
| | 11.025 kHz, 16-bit, Stereo |
| | 22.050 kHz, 8-bit, Mono |
| | 22.050 kHz, 8-bit, Stereo |
| | 22.050 kHz, 16-bit, Mono |
| | 22.050 kHz, 16-bit, Stereo |
| | 44.100 kHz, 8-bit, Mono |
| | 44.100 kHz, 8-bit, Stereo |
| | 44.100 kHz, 16-bit, Mono |
| | 44.100 kHz, 16-bit, Stereo |
| Waveform Input device driver(s) capabilities (see Compaq for technical support) | |
| | |
| Product Name (Driver) | Compaq Portable Wave #00 Line |
| Company Name | Compaq Computer Corporation |
| Product Identifier | 10 |
| Driver Version | 0.1 |
| Input Format | Monaural |
| MIDI Output device driver(s) capabilities (see Compaq for technical support) | |
| | |
| Product Name (Driver) | ESFM Synthesis (220) |
| Company Name | ESS Technology |
| Audio Source | FM Synthesizer |
| Product Identifier | 4 |
| Driver Version | 4.4 |
| Volume Control | Supported |
| Voices supported | 18 |
| Simultaneous notes supported | 18 |
| MIDI Output device driver(s) capabilities (see Compaq for technical support) | |
| | |
| Product Name (Driver) | ESS MPU-401 |
| Company Name | ESS Technology |
| Audio Source | MIDI Hardware Port |
| Product Identifier | 9 |
| Driver Version | 4.4 |
| Volume Control | Supported |
| MIDI Input device driver(s) capabilities (see Compaq for technical support) | |
| | |
| Product Name (Driver) | ESS MPU-401 |
| Company Name | ESS Technology |
| Product Identifier | 10 |
| Driver Version | 4.4 |
| Auxiliary Audio device driver(s) capabilities (see Compaq for technical support) | |
| | |
| Product Name (Driver) | ESS AudioDrive Line-In (220) |
| Company Name | ESS Technology |
| Audio Source | Auxiliary Input Jacks |

-continued

| Compaq Diagnostics for Windows 2.11 | |
|---|---|
| Product Identifier | 3 |
| Driver Version | 4.4 |
| Volume Control | Separate left and right control |
| Product Name (Driver) | ESS AudioDrive CD-Audio (220) |
| Company Name | ESS Technology |
| Product Identifier | 8 |
| Driver Version | 4.4 |
| Volume Control | Separate left and right control |
| Windows | |
| Windows Version | 95 |
| Revision | 4.0 |
| Build | 67109975 |
| Windows directory | C:\WINDOWS |
| Windows system directory | C:\WINDOWS\SYSTEM |
| Windows Memory Information | |
| Total Physical Memory | 33054 Kbytes |
| Free Physical Memory | 0 Kbytes |
| Total Virtual Memory | 2143289 Kbytes |
| Free Virtual Memory | 2053373 Kbytes |
| Architecture | |
| PCI Devices Information | |
| Signature | PCI |
| Config Mechanism #1 | Supported |
| Config Mechanism #2 | Not Supported |
| Spec Cycle for Config #1 | Supported |
| Spec Cycle for Config #2 | Not Supported |
| BIOS Interface Version | 2.10 |
| Last PCI Bus Number | 0 |
| Number of PCI Devices | 2 |
| Bus Number | 0 |
| Device Number | 13 |
| Function Number | 0 |
| Slot Number | 0 |
| Vendor ID | 5333h |
| Device ID | 8812h |
| Revision ID | 43h |
| Device Type | VGA Compatible Controller |
| Programming Interface | 0 |
| Expansion ROM Base Address | FFFF0000h |
| IRQ Line | 11 |
| IRQ Pin | INTA# |
| Memory Address Base | 40000000h |
| Memory Address Length | 4000000h |
| Bus Number | 0 |
| Device Number | 14 |
| Function Number | 1 |
| Slot Number | 0 |
| Vendor ID | E11h |
| Device ID | AE33h |
| Revision ID | 3h |
| Device Type | IDE Controller |
| Programming Interface | 234 |
| Expansion ROM Base Address | 0h |
| IRQ Line | 14 |
| IRQ Pin | INTA# |
| IO Address Base | 0h |
| IO Address Length | 8h |
| IO Address Base | 0h |
| IO Address Length | 4h |
| IO Address Base | 0h |
| IO Address Length | 4h |
| Does system have PCMCIA capabilities | Yes |
| Health | |
| Temperature | Normal |
| Does ROM have embedded diagnostics | No |
| Miscellaneous | |

*** Dump of C:\SYSTEM.SAV\INFO.BOM (4242 Bytes) ***
*** Last modified On: 1/31/97, 0:00:00AM ***
SKU Number: 315650-001

-continued

Compaq Diagnostics for Windows 2.11

[Info]

SkuNumber=315650-001 Rev 100
BomID=50000 Rev 1
[Zips]

File1=138782-00A Rev 2, 12 MB System −2.0 Gb Primary −2.0 Gb Secondary − 0 Mb
File2=138701-00A Rev 33, QTR Star Startup [XXXXX XX] Ver 1.00 Rev 1 Ext 1 Int 2
File3=138703-00A Rev 31, Windows 95 OSR2 [WIN40 US] Ver 4.00 Rev 2 Ext 1 Int 1
File4=138740-00A Rev 43, Star T Config [WIN40 US] Ver 1.00 Rev 1 Ext 3 Int 1
File5=138757-00A Rev 31, Dynamic Floppy QFE [WIN40 US] Ver 4.00.1112 Rev 1 Ext 2 Int 1
File6=138747-00A Rev 32, Universal Serial Bus SR2 [WIN40 US] Ver 1.00 Rev 1 Ext 1 Int 2
File7=138745-00A Rev 32, MS DirectX Drivers [WIN40 US] Ver 3.0A Rev 2 Ext 1 Int 2
File8=138758-00A Rev 42, Windows 95 CONFIG [WIN40 XX] Ver 2.00 Rev 1 Ext 2 Int 7
File9=\US\WIN40\PWR95__B1.EXE, 138751-00A Rev 32, Power Management Win95 [WIN40 US] Ver 2.01 Rev 2 Ext 1 Int 1
File10=\US\SEC32__C2.EXE, 138737-00A Rev 34, Security 32, Win95 [WIN40 US] Ver 1.10 Rev 3 Ext 2 Int 1
File11=\GLOBAL\WIN40\DSVD2.EXE, 138748-00A Rev 31, DSVD NetMeeting [WIN40 US] Ver 1.20 Rev 1 Ext 3 Int 1
File12=\US\PK32__B2.EXE, 138736-00A Rev 36, Programmable Keys [XXXXX US] Ver 1.10 Rev 2 Ext 2 Int 5
File13=\US\WIN40\USTELE95.EXE, 138760-00A Rev 32, Telephony Modem Support [WIN40 US] Ver 2.16 Rev 1 Ext 2 Int 1
File14=\GLOBAL\WIN40\MEDIAM.EXE, 138750-00A Rev 31, Mediamatix MPEG [WIN40 US] Ver 2.00.03 Rev 2 Ext 1 Int 1
File15=\GLOBAL\WIN40\FLASH.EXE, 138746-00A Rev 31, Intel Flash [WIN40 US] Ver 1.00 Rev 1 Ext 2 Int 1
File16=\US\WIN40\USAPPAL.EXE, 138755-00A Rev 31, Appaloosa [WIN40 US] Ver 1.20 Rev 1 Ext 6 Int 1
File17=138812-00A Rev 32, MS Internet Explorer for Win95 - APL [WIN40 US] Ver 4.00 Rev 1 Ext 1 Int 1
File18=\US\WIN40\DTM95__D2.EXE, 138739-00A Rev 31, Insight Management [WIN40 US] Ver 3.20 Rev 4 Ext 2 Int 1
File19=\US\WIN40\USFRESH.EXE, 138749-00A Rev 31, Refresh Rate, S3 DSPLY [WIN40 US] Ver 1.03.08 Rev 1 Ext 1 Int 1
File20=\US\USMONCON.EXE, 138735-00A Rev 31, Monitor Config Utility [XXXXX US] Ver 1.00 Rev 1 Ext 4 Int 1
File21=\GLOBAL\CPQNS.EXE, 138734-00A Rev 31, Compaq Network Support [XXXXX XX] Ver 1.00 Rev 11 Ext 1 Int 1
File22=\US\WIN40\USRMSPT.EXE, 138752-00A Rev 31, MS-DOS Real Mode [WIN40 US] Ver 1.00 Rev 1 Ext 3 Int 1
File23=\US\WIN40\US4WDIAG.EXE, 138742-00A Rev 31, Diagnostics For Windows [WIN40 US] Ver 1.20 Rev 2 Ext 1 Int 1
File24=\US\STREF__84.EXE, 138730-00A Rev 34, Star T Help [XXXXX US] Ver 1.00 Rev 2 Ext 4 Int 3
File25=\US\STOPT__B1.EXE, 138731-00A Rev 34, Star T Options [XXXXX US] Ver 1.00 Rev 2 Ext 1 Int 3
File26=\US\WIN40\USSCGD4.EXE, 138743-00A Rev 31, Safety and Comfort Guide [WIN40 US] Ver 3.0 Rev 3 Ext 1 Int 1
File27=\GLOBAL\WIN40\POINTCST.EXE, 138756-00A Rev 31, Pointcast [WIN40 US] Ver 1.38 Rev 2 Ext 2 Int 1
File28=\US\WIN40\USCOLT.EXE, 138754-00A Rev 31, Colt Modem Tester [WIN40 US] Ver 1.09 Rev 1 Ext 4 Int 1
File29=\US\WIN40\USPEDIT.EXE, 138761-00A Rev 31, MS Policy Editor [WIN40 US] Ver 1.00 Rev 2 Ext 1 Int 1
File30=138738-00A Rev 41, CIA TOOLS [XXXXX XX] Ver 3.01 Rev 1 Ext 2 Int 2
File31=138829-00A Rev 33, A4TOOLS [WIN40 XX] Ver 1.10 Rev 1 Ext 2 Int 2
File32=138728-00A Rev 32, Diags PC [XXXXX XX] Ver 10.19 Rev 1 Ext 2 Int 2
File33=138729-00A Rev 31, F10 Setup [XXXXX US] Ver 2.00 Rev 8 Ext 2 Int 1
File34=315650-001 Rev 100, INFO.BOM component
[US.WIN40]

Defaults=US, USA
File1=138701-00A Rev 33
File2=138703-00A Rev 31
File3=138740-00A Rev 43
File4=138757-00A Rev 31
File5=138747-00A Rev 32
File6=138745-00A Rev 32
File7=138758-00A Rev 42
File8=\US\WIN40\PWR95__B1.EXE
File9=\US\SEC32__C2.EXE
File10=\GLOBAL\WIN40\DSVD2.EXE
File11=\US\PK32__B2.EXE -continued Compaq Diagnostics for Windows 2.11

File12=\US\WIN40\USTELE95.EXE
File13=\GLOBAL\WIN40\MEDIAM.EXE
File14=\GLOBAL\WIN40\FLASH.EXE
File15=\US\WIN40\USAPPAL.EXE
File16=138812-00A Rev 32
File17=\US\WIN40\DTM95_D2.EXE
File18=\US\WIN40\USFRESH.EXE
File19=\US\USMONCON.EXE
File20=\GLOBAL\CPQNS.EXE
File21=\US\WIN40\USRMSPT.EXE
File22=\US\WIN40\US4WDIAG.EXE
File23=\US\STREF_B4.EXE
File24=\US\STOPT_B1.EXE
File25=\US\WIN40\USSCGD4.EXE
File26=\GLOBAL\WIN40\POINTCST.EXE
File27=\US\WIN40\USCOLT.EXE
File28=\US\WIN40\USPEDIT.EXE
File29=138738-00A Rev 41
File30=138829-00A Rev 33
File31=138728-00A Rev 32
File32=138729-00A Rev 31

System Configuration Memory

| | | | | |
|---|---|---|---|---|
| 00–0F: | 42 00 07 00 | 10 00 06 08 | 09 98 26 02 | 50 80 00 00 |
| 10–1F: | 40 F2 F0 10 | 03 80 02 00 | 3C 41 00 00 | 00 FF 63 00 |
| 20–2F: | 00 00 00 00 | 7E 29 00 40 | 00 97 00 45 | 80 00 06 D9 |
| 30–3F: | 00 3C 19 80 | 01 11 XX XX | XX XX XX XX | XX XX XX XX |

BIOS Data Area

| | | | | |
|---|---|---|---|---|
| 40:0000: | F8 03 F8 02 | E8 03 00 00 | 78 03 00 00 | 00 00 13 02 |
| 40:0010: | 27 C6 01 80 | 02 00 00 00 | 00 00 1E 00 | 1E 00 00 00 |
| 40:0020: | 00 00 00 00 | 00 00 00 00 | 00 00 00 00 | 00 00 00 00 |
| 40:0030: | 00 00 00 00 | 00 00 00 00 | 00 00 00 00 | 00 00 01 00 |
| 40:0040: | 50 80 70 3F | 01 00 00 AE | 10 6D 80 00 | FF FF 00 00 |
| 40:0050: | 00 00 00 00 | 00 00 00 00 | 00 00 00 00 | 00 00 00 00 |
| 40:0060: | 00 00 00 D4 | 03 29 30 E0 | FF 00 20 FF | 16 21 0A 00 |
| 40:0070: | 00 00 00 12 | 00 01 08 01 | 14 14 14 3C | 01 01 01 01 |
| 40:0080: | 1E 00 3E 00 | 2F 10 00 E0 | 09 11 0B 01 | 50 00 00 01 |
| 40:0090: | 17 00 00 00 | 00 00 00 00 | 00 00 00 00 | 00 00 00 00 |
| 40:00A0: | 00 00 00 00 | 00 00 00 00 | 7B 28 00 C0 | 00 00 00 00 |
| 40:00B0: | 00 00 00 00 | 00 00 00 00 | 00 00 00 00 | 00 00 00 00 |
| 40:00C0: | 00 00 00 00 | 00 00 00 00 | 00 00 00 00 | 00 00 00 00 |
| 40:00D0: | 00 00 00 00 | 00 00 00 00 | 00 00 00 00 | 00 00 00 00 |
| 40:00E0: | 00 00 00 00 | 00 00 00 00 | 00 00 00 00 | 00 00 00 00 |
| 40:00F0: | 00 00 00 00 | 00 00 00 00 | 00 00 00 00 | 00 00 00 00 |

Interrupt Vector Table

| | | | | |
|---|---|---|---|---|
| 00–03: | 00C9:000B | C0FF:F508 | 0F65:0016 | 0000:0224 |
| 04–07: | 0070:0465 | F000:FF54 | F000:331E | F000:9BD0 |
| 08–0B: | CC00:0000 | 0F65:0028 | F000:9BD0 | F000:9BD0 |
| 0C–0F: | F000:9BD0 | F000:9BD0 | 0F65:009A | 0070:0465 |
| 10–13: | CC70:0007 | F000:F84D | F000:F841 | FD5E:2537 |
| 14–17: | F000:E739 | 0254:0240 | 0070:042D | 029D:0A28 |
| 18–1B: | F000:49C5 | 1026:002F | F000:FE6E | 029D:0604 |
| 1C–1F: | CC00:001D | F000:F0A4 | 0000:0522 | C000:5D06 |
| 20–23: | 00C9:0FA8 | 105A:042F | FCB2:2FF7 | FD7B:2367 |
| 24–27: | 1148:0003 | 00C9:0FBC | 00C9:0FC6 | 00C9:0FD0 |
| 28–2B: | 00C9:106C | 0070:0466 | 029D:05B4 | 00C9:106C |
| 2C–2F: | 00C9:106C | 00C9:106C | 102B:0000 | 105A:03F6 |
| 30–33: | C90F:E4EA | F000:9B00 | 00C9:106C | 113A:0001 |
| 34–37: | 00C9:106C | 00C9:106C | 00C9:106C | 00C9:106C |
| 38–3B: | 00C9:106C | 00C9:106C | 00C9:106C | 00C9:106C |
| 3C–3F: | 00C9:106C | 00C9:106C | 00C9:106C | 00C9:106C |
| 40–43: | F000:CEB6 | F000:E801 | F000:F065 | C000:7032 |
| 44–47: | F000:9BD0 | F000:9BD0 | F000:E401 | F000:9BD0 |
| 48–4B: | F000:9BD0 | F000:9BD0 | F000:9BD0 | FD4C:2657 |
| 4C–4F: | F000:9BD0 | F000:9BD0 | F000:9BD0 | 0070:04FC |
| 50–53: | F000:9BD0 | F000:9BD0 | F000:9BD0 | F000:9BD0 |
| 54–57: | F000:9BD0 | F000:9BD0 | F000:9BD0 | F000:9BD0 |
| 58–5B: | F000:9BD0 | F000:9BD0 | F000:9BD0 | F000:9BD0 |
| 5C–5F: | 1147:000D | F000:9BD0 | F000:9BD0 | F000:9BD0 |
| 60–63: | 0000:0000 | 0000:0000 | 0000:0000 | 0000:0000 |
| 64–67: | 0000:0000 | 0000:0000 | 0000:0000 | 113B:0040 |
| 68–6B: | F000:9BD0 | F000:9BD0 | F000:9BD0 | F000:9BD0 |
| 6C–6F: | F000:9BD0 | C000:39E6 | F000:9BD0 | F000:9BD0 |
| 70–73: | 0F65:0035 | F000:9C1F | F000:9BD0 | F000:9BD0 |
| 74–77: | 0F65:00E2 | F000:9C28 | 0F65:00FA | F000:9BD0 |

-continued

| Compaq Diagnostics for Windows 2.11 | | | | |
|---|---|---|---|---|
| 78–7B: | 0000:0000 | 0000:0000 | 0000:0000 | 0000:0000 |
| 7C–7F: | 0000:0000 | 0000:0000 | 0000:0000 | 0000:0000 |
| 80–83: | 0000:0000 | 0000:0000 | 0000:0000 | 0000:0000 |
| 84–87: | 0000:0000 | 0000:0000 | 0000:0000 | 0000:0000 |
| 88–8B: | 0000:0000 | 0000:0000 | 0000:0000 | 0000:0000 |
| 8C–8F: | 0000:0000 | 0000:0000 | 0000:0000 | 0000:0000 |
| 90–93: | 0000:0000 | 0000:0000 | 0000:0000 | 0000:0000 |
| 94–97: | 0000:0000 | 0000:0000 | 0000:0000 | 0000:0000 |
| 98–9B: | 0000:0000 | 0000:0000 | 0000:0000 | 0000:0000 |
| 9C–9F: | 0000:0000 | 0000:0000 | 0000:0000 | 0000:0000 |
| A0–A3: | 0000:0000 | 0000:0000 | 0000:0000 | 0000:0000 |
| A4–A7: | 0000:0000 | 0000:0000 | 0000:0000 | 0000:0000 |
| A8–AB: | 0000:0000 | 0000:0000 | 0000:0000 | 0000:0000 |
| AC–AF: | 0000:0000 | 0000:0000 | 0000:0000 | 0000:0000 |
| B0–B3: | 0000:0000 | 0000:0000 | 0000:0000 | 0000:0000 |
| B4–B7: | 0000:0000 | 0000:0000 | 0000:0000 | 0000:0000 |
| B8–BB: | 0000:0000 | 0000:0000 | 0000:0000 | 0000:0000 |
| BC–BF: | 0000:0000 | 0000:0000 | 0000:0000 | 0000:0000 |
| C0–C3: | 0000:0000 | 0000:0000 | 0000:0000 | 0000:0000 |
| C4–C7: | 0000:0000 | 0000:0000 | 0000:0000 | 0000:0000 |
| C8–CB: | 0000:0000 | 0000:0000 | 0000:0000 | 0000:0000 |
| CC–CF: | 0000:0000 | 0000:0000 | 0000:0000 | 0000:0000 |
| D0–D3: | 0000:0000 | 0000:0000 | 0000:0000 | 0000:0000 |
| D4–D7: | 0000:0000 | 0000:0000 | 0000:0000 | 0000:0000 |
| D8–DB: | 0000:0000 | 0000:0000 | 0000:0000 | 0000:0000 |
| DC–DF: | 0000:0000 | 0000:0000 | 0000:0000 | 0000:0000 |
| E0–E3: | 0000:0000 | 0000:0000 | 0000:0000 | 0000:0000 |
| E4–E7: | 0000:0000 | 0000:0000 | 0000:0000 | 0000:0000 |
| E8–EB: | 0000:0000 | 0000:0000 | 0000:0000 | 0000:0000 |
| EC–EF: | 0000:0000 | 0000:0000 | 0000:0000 | 0000:0000 |
| F0–F3: | 0000:0000 | 0000:0000 | 0000:0000 | 0000:0000 |
| F4–F7: | 0000:0000 | 0000:0000 | 0000:0000 | 0000:0000 |
| F8–FB: | 0000:0000 | 0000:0000 | 0000:0000 | 0000:0000 |
| FC–FF: | 0000:0000 | 0000:0000 | 0000:0000 | 0000:0000 |
| Is System Information Table supported | | | Yes | |
| Is Desktop Management Interface supported | | | No | |
| SIT Header Record | | | | |

21 53 49 54
Power Conservation Record 01 11 FF 2F FB 02 01 48 01 00 88 00 22 00 00 00
B0 C4 04

| | |
|---|---|
| SIT Record Id | 1 (01h) |
| SIT Record Length | 17 (11h) |
| Is system standby supported | Yes |
| Is hard drive timeout supported | Yes |
| Is screen save supported | Yes |
| Are the power conservation beeps controllable | Yes |
| Is system idle timeout supported | Yes |
| Is hibernation supported | Yes |
| Is the processor speed configurable | Yes |
| Is the volume controllable | Yes |
| Is maximum brightness controllable | Yes |
| Is advanced power management supported | Yes |
| Are popups supported | Yes |
| Is the size of the popups changeable | No |
| Is the location of the popups changeable | Yes |
| Is desktop power management supported | No |
| Is the LED blink controllable | No |
| Can PCMCIA slot be turned off during runtime | Yes |
| Can PCMCIA slot be controlled during standby | Yes |
| Does hibernation only occur at lowbat | No |
| Is portable AC power management supported | Yes |
| Is monitor off mode supported | Yes |
| Is AC hard drive timeout supported | Yes |
| Is AC screen save supported | Yes |
| Is software power down available | Yes |
| Is a modem installed in the option slot | No |
| Are screen save and system idle the same | No |
| Configurable processor speeds | 1 and ½ |
| Is desktop suspend state supported | No |
| Quick energy save support type | Not supported |
| SMI Offset | 0 (00h) |
| SMI Segment | 45056 (B000h) |
| Number of Batteries | 4 |

-continued

| Compaq Diagnostics for Windows 2.11 | |
|---|---|
| SMI Generation scheme | Int 10 |
| Number of programmable keys | 4 |
| System Standby Timeout Record | |

02 12 00 01 02 03 04 05 06 07 08 09 0A 0B 0C 0D
0E 0F 10 11

| | |
|---|---|
| SIT Record Id | 2 (02h) |
| SIT Record Length | 18 (12h) |
| Entry # 0 | 0 (00h) minute(s) |
| Entry # 1 | 1 (01h) minute(s) |
| Entry # 2 | 2 (02h) minute(s) |
| Entry # 3 | 3 (03h) minute(s) |
| Entry # 4 | 4 (04h) minute(s) |
| Entry # 5 | 5 (05h) minute(s) |
| Entry # 6 | 6 (06h) minute(s) |
| Entry # 7 | 7 (07h) minute(s) |
| Entry # 8 | 8 (08h) minute(s) |
| Entry # 9 | 9 (09h) minute(s) |
| Entry # 10 | 10 (0Ah) minute(s) |
| Entry # 11 | 11 (0Bh) minute(s) |
| Entry # 12 | 12 (0Ch) minute(s) |
| Entry # 13 | 13 (0Dh) minute(s) |
| Entry # 14 | 14 (0Eh) minute(s) |
| Entry # 15 | 15 (0Fh) minute(s) |
| Entry # 16 | 16 (10h) minute(s) |
| Entry # 17 | 17 (11h) minute(s) |
| Screen Save/Monitor Timeout Record | |

03 20 00 01 02 03 04 05 06 07 08 09 0A 0B 0C 0D
0E 0F 10 11 12 13 14 15 16 17 18 19 1A 1B 1C 1D
1E 1F

| | |
|---|---|
| SIT Record Id | 3 (03h) |
| SIT Record Length | 32 (20h) |
| Entry # 0 | 0 (00h) minute(s) |
| Entry # 1 | 1 (01h) minute(s) |
| Entry # 2 | 2 (02h) minute(s) |
| Entry # 3 | 3 (03h) minute(s) |
| Entry # 4 | 4 (04h) minute(s) |
| Entry # 5 | 5 (05h) minute(s) |
| Entry # 6 | 6 (06h) minute(s) |
| Entry # 7 | 7 (07h) minute(s) |
| Entry # 8 | 8 (08h) minute(s) |
| Entry # 9 | 9 (09h) minute(s) |
| Entry # 10 | 10 (0Ah) minute(s) |
| Entry # 11 | 11 (0Bh) minute(s) |
| Entry # 12 | 12 (0Ch) minute(s) |
| Entry # 13 | 13 (0Dh) minute(s) |
| Entry # 14 | 14 (0Eh) minute(s) |
| Entry # 15 | 15 (0Fh) minute(s) |
| Entry # 16 | 16 (10h) minute(s) |
| Entry # 17 | 17 (11h) minute(s) |
| Entry # 18 | 18 (12h) minute(s) |
| Entry # 19 | 19 (13h) minute(s) |
| Entry # 20 | 20 (14h) minute(s) |
| Entry # 21 | 21 (15h) minute(s) |
| Entry # 22 | 22 (16h) minute(s) |
| Entry # 23 | 23 (17h) minute(s) |
| Entry # 24 | 24 (18h) minute(s) |
| Entry # 25 | 25 (19h) minute(s) |
| Entry # 26 | 26 (1Ah) minute(s) |
| Entry # 27 | 27 (1Bh) minute(s) |
| Entry # 28 | 28 (1Ch) minute(s) |
| Entry # 29 | 29 (1Dh) minute(s) |
| Entry # 30 | 30 (1Eh) minute(s) |
| Entry # 31 | 31 (1Fh) minute(s) |
| Hard Drive Timeout Record | |

04 12 00 01 02 03 04 05 06 07 08 09 0A 0B 0C 0D
0E 0F 10 11

| | |
|---|---|
| SIT Record Id | 4 (04h) |
| SIT Record Length | 18 (12h) |
| Entry # 0 | 0 (00h) minute(s) |
| Entry # 1 | 1 (01h) minute(s) |
| Entry # 2 | 2 (02h) minute(5) |
| Entry # 3 | 3 (03h) minute(s) |
| Entry # 4 | 4 (04h) minute(s) |
| Entry # 5 | 5 (05h) minute(s) |

-continued

| Compaq Diagnostics for Windows 2.11 | |
|---|---|
| Entry # 6 | 6 (06h) minute(s) |
| Entry # 7 | 7 (07h) minute(s) |
| Entry # 8 | 8 (08h) minute(s) |
| Entry # 9 | 9 (09h) minute(s) |
| Entry # 10 | 10 (0Ah) minute(s) |
| Entry # 11 | 11 (0Bh) minute(s) |
| Entry # 12 | 12 (0Ch) minute(s) |
| Entry # 13 | 13 (0Dh) minute(s) |
| Entry # 14 | 14 (0Eh) minute(s) |
| Entry # 15 | 15 (0Fh) minute(s) |
| Entry # 16 | 16 (10h) minute(s) |
| Entry # 17 | 17 (11h) minute(s) |
| Security Features Record | |
| | |
| 05  03  04  BE  78 | |
| SIT Record Id | 5 (05h) |
| SIT Record Length | 3 (03h) |
| Is diskette drive control supported | Yes |
| Is diskette drive write control supported | Yes |
| Is serial port control supported | Yes |
| Is parallel port control supported | Yes |
| Is PCMCIA slot control supported | Yes |
| Is SafeStart virus detection supported | No |
| Password type | 7 character |
| Is locking of password bytes supported | Yes |
| Allow changeable features if setup password | Yes |
| Processor/Memory/Cache Record | |
| | |
| 06  15  0A  01  07  20  00  06  10  00  90  00  00  00  00  00 | |
| 00  00  00  00  00  00  00 | |
| SIT Record Id | 6 (06h) |
| SIT Record Length | 21 (15h) |
| Processor speed | 266 MHz |
| L2 Cache | |
| | |
| Cache installed | Installed |
| Cache option | Optional/Permanent |
| Write policy | Write back |
| Size | 512 Kbytes |
| Speed | 0 ns |
| Total soldered memory | 16 MB |
| Maximum memory installable | 144 MB |
| L3 Cache | |
| | |
| Processor | |
| Cache option | Not available |
| Cache installed | Not installed |
| Write policy | Write through |
| Size | 0 Kbytes |
| Speed | 0 ns |
| Processor 2 | |
| | |
| Cache option | Not available |
| Cache installed | Not installed |
| Write policy | Write through |
| Size | 0 Kbytes |
| Speed | 0 ns |
| Processor 3 | |
| | |
| Cache option | Not available |
| Cache installed | Not installed |
| Write policy | Write through |
| Size | 0 Kbytes |
| Speed | 0 ns |
| Processor 4 | |
| | |
| Cache option | Not available |
| Cache installed | Not installed |
| Write policy | Write through |
| Size | 0 Kbytes |
| Speed | 0 ns |
| Processor designer | 0 |
| General System Peripheral and Input Device Information Record | |
| | |
| 07  1D  E7  11  82  33  33  30  35  3A  3F  04  11  00  12  1E | |
| 24  12  27  01  00  AC  00  01  00  00  01  24  13  F0  F0 | |
| SIT Record Id | 7 (07h) |

-continued

| Compaq Diagnostics for Windows 2.11 | |
|---|---|
| SIT Record Length | 29 (1Dh) |
| Does ROM support F10 partition | Yes |
| Is the System ROM flashable | Yes |
| Backup copy of CMOS supported | No |
| Is on-board bootable SCSI supported | No |
| Does BIOS support hard drive DMA | Yes |
| Does system have PCMCIA capabilities | Yes |
| Does system support enhanced IDE DMA | Yes |
| Does ROM have CD-ROM boot support | Yes |
| Does system ROM have a boot block | No |
| Does ROM have embedded diagnostics | No |
| Does ROM support POST speedup feature | Yes |
| Is TV Tuner Installed | No |
| Is El Torito Standard CD-ROM boot available | No |
| Form Factor | Laptop notebook or sub-notebook |
| Soft drive type 65 | |
| Is soft drive type supported | Yes |
| Number of bytes of soft drive type data | 5 bytes |
| Location of soft drive type data | Extended System Configuration Memory |
| What is starting address of the data | 48 (30h) |
| Soft drive type 66 | |
| Is soft drive type supported | Yes |
| Number of bytes of soft drive type data | 5 bytes |
| Location of soft drive type data | Extended System Configuration Memory |
| What is starting address of the data | 53 (35h) |
| Soft drive type 68 | |
| Is soft drive type supported | Yes |
| Number of bytes of soft drive type data | 5 bytes |
| Location of soft drive type data | Extended System Configuration Memory |
| What is starting address of the data | 58 (3Ah) |
| Soft drive type 15 | |
| Is soft drive type supported | Yes |
| Number of bytes of soft drive type data | 5 bytes |
| Location of soft drive type data | Extended System Configuration Memory |
| What is starting address of the data | 63 (3Fh) |
| Panel ID | 4 |
| Number of software configurable serial ports | 1 |
| Is the System ROM socketed | No |
| Integrated monitor and system board | No |
| Type of special modem installed | 0 |
| Is EPP mode supported | No |
| Client Management support level | Enhanced |
| Does drive 0 support DFP | Yes |
| Does drive 1 support DFP | No |
| Does drive 2 support DFP | No |
| Does drive 3 support DFP | No |
| PCI bus master enable/disable | |
| CMOS offset | 30 |
| Bit location | 4 |
| CMOS type | Non-Volatile RAM |
| VGA palette snoop enable/disable | |
| CMOS offset | 18 |
| Bit location | 7 |
| CMOS type | Non-Volatile RAM |
| Are multiple PCI busses supported | Yes |
| I2C I/O Address | 44032 |
| Bit position of I2C SCL Signal | 0 |
| Bit position of I2C SDA Signal | 0 |
| I2C start/stop conditions | Normal |
| ATAPI device information | |
| First logical device | Not Installed |
| Second logical device | CD-ROM Drive |

-continued

| Compaq Diagnostics for Windows 2.11 | |
|---|---|
| Third logical device | Not Installed |
| Fourth logical device | Not Installed |
| 3-D audio support | |
| | |
| Audio device | Not present |
| Tone control device | Not present |
| Is Quick Boot Supported | Yes |
| Are Stick Ctrl, Alt, Shift Keys supported | No |
| Are Microsoft scan codes supported | No |
| Is power inhibit supported | No |
| Back to back I/O delay Index 0 | 61459 (F013h) |
| Back to back I/O delay Index 1 | 2288 (8F0h) |
| Memory Module Information Record | |
| | |
| 08  09  02  00  00  46  03  01  10  46  03 | |
| SIT Record Id | 8 (08h) |
| SIT Record Length | 9 (09h) |
| Number of existing memory sockets | 2 |
| System socket number | 0 |
| Expansion board slot number | 0 |
| Amount of memory in MB | 0 MB |
| Is parity supported | No |
| System socket number | 1 |
| Expansion board slot number | 0 |
| Amount of memory in MB | 16 MB |
| Speed of memory in ns | 70 ns |
| Memory Form Factor | DIMM |
| Is parity supported | No |
| Timeout Default Value Record | |
| | |
| 09  0A  03  01  01  4B  64  05  02  03  4B  64 | |
| SIT Record Id | 9 (09h) |
| SIT Record Length | 10 (0Ah) |
| Conservation parameters when power conservation level is set to High | |
| | |
| Standby | 3 minute(s) (03h) |
| Hard drive or system idle timeout | 1 minute(s) (01h) |
| Screen save/monitor timeout | 1 minute(s) (01h) |
| Maximum brightness | 75% (4Bh) |
| Processor speed | 100% (64h) |
| Conservation parameters when power conservation level is set to Medium | |
| | |
| Standby | 5 minute(s) (05h) |
| Hard drive or system idle timeout | 2 minute(s) (02h) |
| Screen save/monitor timeout | 3 minute(s) (03h) |
| Maximum brightness | 75% (4Bh) |
| Processor speed | 100% (64h) |
| CMOS and NVRAM Information Record | |
| | |
| 0A  05  7F  00  3F  00  01 | |
| SIT Record Id | 10 (0Ah) |
| SIT Record Length | 5 (05h) |
| Number of bytes of NVRAM or ECMOS | 127 (7Fh) |
| Number of bytes of CMOS | 63 (3Fh) |
| NVRAM access type | Index:820h, Data:800h–81fh |
| Extended Disk Support Record | |
| | |
| 0E  02  A1  DE | |
| SIT Record Id | 14 (0Eh) |
| SIT Record Length | 2 (02h) |
| Pointer to extended disk table | 56993 |
| Product Name Header Record | |
| | |
| 10  0E  41  72  6D  61  64  61  20  37  37  39  32  44  4D  00 | |
| SIT Record Id | 16 (10h) |
| SIT Record Length | 14 (0Eh) |
| Product Name (Driver) | Armada 7792DM |
| Version information for Compaq Diagnostics for Windows | |
| | |
| CPQDIAG.EXE | 8/26/98 9:50:34AM |
| DL_DISK.DLL | 8/26/98 10:04:00AM |
| DL_SCSI.DLL | 8/26/98 10:04:10AM |
| DL_PAR.DLL | 8/26/98 10:04:10AM |
| DL_SER.DLL | 8/26/98 10:04:12AM |
| DL_AUDIO.DLL | 8/26/98 10:03:58AM |
| DL_CPU.DLL | 8/26/98 10:04:00AM |
| DL_INPUT.DLL | 8/26/98 10:04:02AM |

-continued

Compaq Diagnostics for Windows 2.11

| | |
|---|---|
| DL_MODEM.DLL | 8/26/98 10:04:06AM |
| DL_VIDEO.DLL | 8/26/98 10:04:14AM |
| DL_MEM.DLL | 8/26/98 10:04:04AM |

Further features which are contemplated as advantageous with the presently disclosed innovations are described in copending U.S. application Ser. No. 09/429,226, which is owned in common with the present application and has the same filing date as the present application, and which is hereby incorporated by reference.

Definitions

Following are short definitions of the usual meanings of some of the technical terms which are used in the present application. (However, those of ordinary skill will recognize whether the context requires a different meaning.) Additional definitions can be found in the standard technical dictionaries and journals.

Hardware: the physical, tangible components of a computer system.

Operating system: a set of programs controlling the operations of a computer system, such as assemblers or input and output facilities.

API: Application Programming Interface, which allows an application to request that the operating system perform an action or a set of actions. Here, the MAPI (Mail API) launches the user's email system, given the required information.

Primitives: basic operations performed by the operating system, such as writing to the hard disk, putting graphics on the screen, or reading data from the CDROM port.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

In a preferred embodiment, the presently disclosed innovation is used on a computer running any of the Windows 95/98/NT/2000 operating systems. Any other operating system may be used with the present innovations.

The base and current computer hardware and operating system information is captured in ASCII text files using Compaq Diagnostics for Windows. Storage of the data in any format is within the contemplation of the invention.

The design builds on Compaq Diagnostics for Windows. However, any diagnostics program could be the foundation for the presently disclosed innovations.

The diagnostics program can be an operating system level program, or embedded diagnostics can be used.

The information captured by the diagnostics applications need not be limited to hardware and operating system configurations, but can include any data retrievable from the computer that is relevant to servicing the computer or diagnosing the faults on the computer.

The Compaq Diagnostics for Windows application (or its equivalent) can record the configuration data more frequently than only at program installation and program execution. For instance, each time the hardware or operating system undergoes any configuration change, the new configuration is captured and recorded as an ASCII text file. Or, the system may record the configuration data at each startup, preserving the record of configuration changes. In embodiments where there are many sets of configurations stored, each configuration is time stamped so as to preserve a complete chronological record of configuration settings for the computer. Additionally, in embodiments that record configuration more frequently, each time current configurations are recorded, the configurations could automatically be compared with the previous configurations, and only the changes captured in ASCII text files.

The amount of processing of the configuration data done by the diagnostics application can vary. The diagnostics application can merely gather and relay the configuration information, or it could perform some comparison. It could also filter the data, sending only the changes in configuration, or only send data about certain hardware or software.

Comparison and other processing of configuration data could occur at the user's computer locally, or it could be done remotely by a computer at the customer service site.

The program can prompt the user for input regarding the problem, or the data could automatically be sent without user input. Additionally, only the user input information might be sent, with or without the configuration data. These options can be made available as user selected options, or they may be made automatic so that the user need not initiate them. The initial reading of the configurations might be taken not only at installation of the diagnostics program, but could also be taken any time a major change occurs in the computer's system (for example, if the computer had a new operating system installed).

Information other than just hardware and operating system configurations can be captured by the program. Any readable information accessible to the program, be it an operating system level diagnostics program or an embedded diagnostics program, may be captured and used as a service tool. Software and DLL (Dynamic Link Library) versions could be checked. Anything stored in the Windows Registry or in any directory may also be accessed and used in servicing computers.

It should also be noted that the disclosed innovative ideas are not limited only to systems based on an x86-compatible microprocessor, but can also be implemented in systems using 680x0, RISC, or other processor architectures.

It should also be noted that the disclosed innovative ideas are not by any means limited to systems using a single-processor CPU, but can also be implemented in computers using multiprocessor architectures.

Additional general background, which helps to show the knowledge of those skilled in the art regarding the system context, and of variations and options for implementations, may be found in the following publications, all of which are hereby incorporated by reference. In particular, many details may be found in the books from MindShare, Inc., including Protected Mode Software Architecture, Cardbus System Architecture, EISA System Architecture, ISA System Architecture, 80486 System Architecture, Pentium Processor System Architecture, PCMCIA System Architecture, Plug and Play System Architecture, PCI System Architecture, USB System Architecture, and Pentium Pro Processor System Architecture, all of which are hereby incorporated by reference, and in the Pentium Processor Family Developer's Manual 1997, the Multiprocessor Specification (1997), the Intel Architecture Optimizations Manual, the Intel Architecture Software Developer's Manual, the Peripheral Components 1996 databook, the Pentium Pro Processor BIOS Writer's Guide (version 2.0, 1996), and the Pentium Pro Family Developer's Manuals from Intel, all of which are hereby incorporated by reference.

What is claimed is:

1. A method of servicing a computer, the computer including hardware and an operating system, comprising the steps of:

automatically capturing the current configuration data for the hardware and operating system;

requesting a user of the computer to provide information regarding the computer; and when computer service procedures are initiated, sending said current configuration data, user provided data, and previously captured configuration data to a remote location, wherein said previously captured data comprises the computer's initial configuration.

2. The method of claim 1, wherein the remote location is another computer.

3. The method of claim 1, wherein the data is sent by email.

4. The method of claim 1, wherein sending the configuration data to a remote location occurs automatically.

5. A computer system, comprising:

a diagnostics application residing in the computer designed to capture data about the computer, collect information from a user of the computer, and operatively connected to activate the user's email;

wherein the application retains previously captured base configuration data about the computer; and wherein when computer service procedures are initiated, the application requests information from the user, captures current data about the computer, and sends the previously captured base configuration data and the current data to a remote location for use in servicing the computer.

6. The system of claim 5, wherein the data relates to hardware and operating system configuration settings on the computer.

7. The system of claim 5, wherein at least some of the information collected from the computer user is also sent to a remote computer.

8. The system of claim 5, wherein the data is sent by email.

* * * * *